(12) United States Patent
Williams (10) Patent No.: US 6,583,412 B2
(45) Date of Patent: Jun. 24, 2003

(54) SCANNING TUNNELING CHARGE TRANSFER MICROSCOPE

(75) Inventor: Clayton C. Williams, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 221 days.

(21) Appl. No.: 09/811,374

(22) Filed: Mar. 17, 2001

(65) Prior Publication Data

US 2002/0005481 A1 Jan. 17, 2002

Related U.S. Application Data (60) Provisional application No. 60/190,232, filed on Mar. 17, 2000.

(51) Int. Cl.[7] .......................... H01J 37/00; H01J 37/26
(52) U.S. Cl. ...................... 250/306; 250/307; 250/234
(58) Field of Search ................................ 250/306, 307

(56) References Cited

U.S. PATENT DOCUMENTS

| | | | | |
|---|---|---|---|---|
| 5,171,992 A | * | 12/1992 | Clabes et al. ............... | 250/306 |
| 5,969,345 A | * | 10/1999 | Williams et al. ............ | 250/306 |
| 5,994,160 A | * | 11/1999 | Niedermann et al. ......... | 438/53 |
| 6,139,759 A | * | 10/2000 | Doezema et al. ............. | 216/11 |
| 6,358,426 B1 | * | 3/2002 | Muramatsu et al. .......... | 216/11 |
| 6,518,872 B1 | * | 2/2003 | Edinger et al. ............... | 338/25 |

* cited by examiner

Primary Examiner—John R. Lee
Assistant Examiner—Johnnie L Smith, II
(74) Attorney, Agent, or Firm—Kenneth E. Horton; Rader, Fishman & Grauer PLLC (57) ABSTRACT

The present invention develops a new type of SPM, a scanning tunneling charge transfer microscope (STCTM). The STCTM is capable of first, detecting the transfer of an ultrasmall amount of charge (single electrons) or current (attoampere) into or out from a surface with atomic resolution and second, simultaneously measuring the electronic response of that surface to the transferred charge. This dual capability can be achieved by appropriately combining the virtues of the STM and a modified EFM. The STM provides the atomic resolution for the charge transfer, while the modified EFM provides the sub-electronic charge sensitivity for the current and charge detection. The STCTM, with sensitivity many orders of magnitude better than with SPM technology currently available, can be used to characterize the properties of molecules, ultrathin oxides, insulator surfaces, and clusters on insulators with atomic resolution.

27 Claims, 6 Drawing Sheets

SCANNING TUNNELING CHARGE TRANSFER MICROSCOPE

REFERENCES TO RELATED APPLICATIONS

This application claims priority from U.S. provisional patent application No. 60/190,232, filed Mar. 17, 2000 the entire disclosure of which is incorporated herein by reference.

FIELD OF THE INVENTION

The present invention relates to scanning probe microscopes and methods for using the same. In particular, the present invention relates to scanning probe microscopes and methods for using the same to detect the transfer of ultrasmall amounts of charge or current to or from a conducting surface under analysis and additionally measuring the electronic response of that surface to the transferred charge.

BACKGROUND OF THE INVENTION

Scanning probe microscopes (SPMs) include several related technologies for imaging and measuring surfaces on a fine scale, down to the level of molecules and even single atoms. SPM techniques have the ability to operate on a scale from many microns down to sub-nanometers and can image individual atoms and molecules.

SPM technologies share the concept of scanning an extremely sharp tip (up to 50 nm radius of curvature) across the object surface. The tip is often mounted on a flexible cantilever, allowing the tip to move and follow the surface profile. When the tip moves in proximity to the investigated object, various forces of interaction between the tip and the surface influence the movement of the cantilever and are detected by selective sensors. Various other interactions can be measured and studied depending on the type of SPM used.

There are numerous types of SPM technologies, including atomic force microscope (AFM), scanning tunneling microscope (STM), lateral force microscope (LFM), magnetic force microscope (MFM), electrostatic force microscope (EFM), and scanning thermal microscope (SThM). STMs measure a weak electrical current flowing between the tip and the sample. STMs rely on the electrical conductivity of the sample, so features on the sample surface must be electrically conductive to some degree. STM systems measure the quantum tunneling current between a wire or metal-coated silicon tip and the object surface. An electronic feedback system maintains a constant current by positioning the tip at a substantially constant height above the surface.

The intense interest in understanding and utilizing the properties of atomic scale structure has motivated a significant effort to develop instrumentation for the ultrasmall domain. STMs, in particular, have been developed to provide characterization, manipulation and modification in this domain. The unprecedented atomic resolution achieved by STM has provided a direct method for visualizing and manipulating atoms and atomic scale structures. Additionally, the STM has been used to characterize the electronic properties of atomic scale surface structure of the sample being analyzed via stanning tunneling spectroscopy (STS). These abilities make it extremely useful tool for exploring the "nanoworld."

The capabilities of the STM, however, are not limitless. In particular, the STM is limited to imaging structures having sufficient conductivity to provide a measurable current in a reasonable measurement time. Most STM measurements are performed with currents greater than a picoampere ($10^{-12}$ ampere). Serious efforts to optimize current detection techniques have pushed the STM current detection limits into the 0.1 picoampere ($10^{-13}$ ampere) range, and even lower currents can be measured ($10^{-14}$ ampere range) if integration times are increased. However, imaging rapidly becomes very tedious under such conditions.

If the current detection sensitivity of the STM could be improved from the 100 femtoampere range ($10^{-13}$ ampere≈$10^6$ electrons/sec) to the attoampere range ($10^{-18}$ ampere≈10 electrons/sec) previously inaccessible surfaces and applications for the STM would emerge. For example, imaging many biomolecules by STM has been significantly limited by the poor conductivity of these molecules. Imaging these molecules at currents of about $10^3$ to about $10^6$ times smaller would provide several benefits, namely allowing imaging at larger tip/sample separations (larger tunneling gaps) that would reduce the tip-molecule interaction forces which have plagued much of the STM work on weakly adsorbed molecules. As well, molecules that appear as "insulating" at currents in the $10^{-13}$ ampere range may appear as "conducting" for currents in the $10^{-18}$ ampere range.

Due to the limitations of STM, many have turned to AFM to image insulating structures and molecules. While the AFM overcomes the need for electrical conductivity, true atomic spatial resolution by AFM is especially difficult on soft surfaces. As well, AFM devices have not been used to measure the tunneling of electron charges to or from a surface. The AFM also lacks the ability to directly measure the electronic properties of a surface.

If the current detection sensitivity of the STM could be improved to allow detecton of single electrons, then tunneling to or from insulating or localized surface states would be possible. Such sensitivity would also open up a new class of insulating materials that could be studied on the atomic scale. STMs with ultrahigh current sensitivity (i.e., attoamperes) might measure the charge transfer through thin oxides on semiconductors, between quantum dots and clusters, or to single electron devices. Many of these opportunities, as well as others, could be usefully explored by STMs at these ultrasmall currents.

SUMMARY OF THE INVENTION

The present invention develops a new type of SPM, a scanning tunneling charge transfer microscope (STCTM). The STCTM is capable of first, detecting the transfer of an ultrasmall amount of charge (single electrons) or ultrasmall current (attoampere) into or out from a surface with atomic resolution, second, detecting the energy at which the charge is transferred, and third, measuring the electronic response of that surface to the transferred charge. These capabilities can be achieved by appropriately combining the virtues of the STM and a modified EFM. The STM capability provides the atomic resolution for the charge transfer via tunneling, while the modified EFM capability provides the sub-electronic charge sensitivity for the current and charge transfer detection. The STCTM, with sensitivity many orders of magnitude better than with SPM technology currently available, can be used to characterize the properties of molecules, ultrathin oxides, insulator surfaces, and clusters on insulators, among others, with atomic spatial resolution.

BRIEF DESCRIPTION OF THE DRAWINGS

FIGS. 1–6 are views of one aspect of the STCTM systems, apparatus, and methods for using and making the same according to the present invention, in which:

FIG. 1 illustrates one aspect of an STCTM system according to the present invention;

FIGS. 1–6 presented in conjunction with this description are views of only particular-rather than complete-portions of the STCTM systems, apparatus, and methods of using and making the same.

DETAILED DESCRIPTION OF THE INVENTION

The following description provides specific details in order to provide a thorough understanding of the present invention. The skilled artisan, however, would understand that the present invention can be practiced without employing these specific details. Indeed, the present invention can be practiced by modifying the illustrated system and method and can be used in conjunction with apparatus and techniques conventionally used in the industry. For example, the present invention could be modified for other types of measurements than those described herein.

The present invention utilizes the charge sensitivity of an EFM to measure the charge transfer between an STCTM tip and surface of a sample under analysis (the "sample") via tunneling, with atomic spatial resolution. In other words, the present invention combines the abilities of an STM and an EFM: like an STM, the device of the present invention provides a powerful method for transferring charge into or from a surface with atomic resolution and, like an EFM, the device of the present provides a method for measuring the charge with a sensitivity adequate to detect 1 electronic charge. Thus, the present invention combines the capabilities of both technologies and provides a method for characterizing the spatial, electronic, and electrostatic properties of atomic scale structures.

Figure 1:
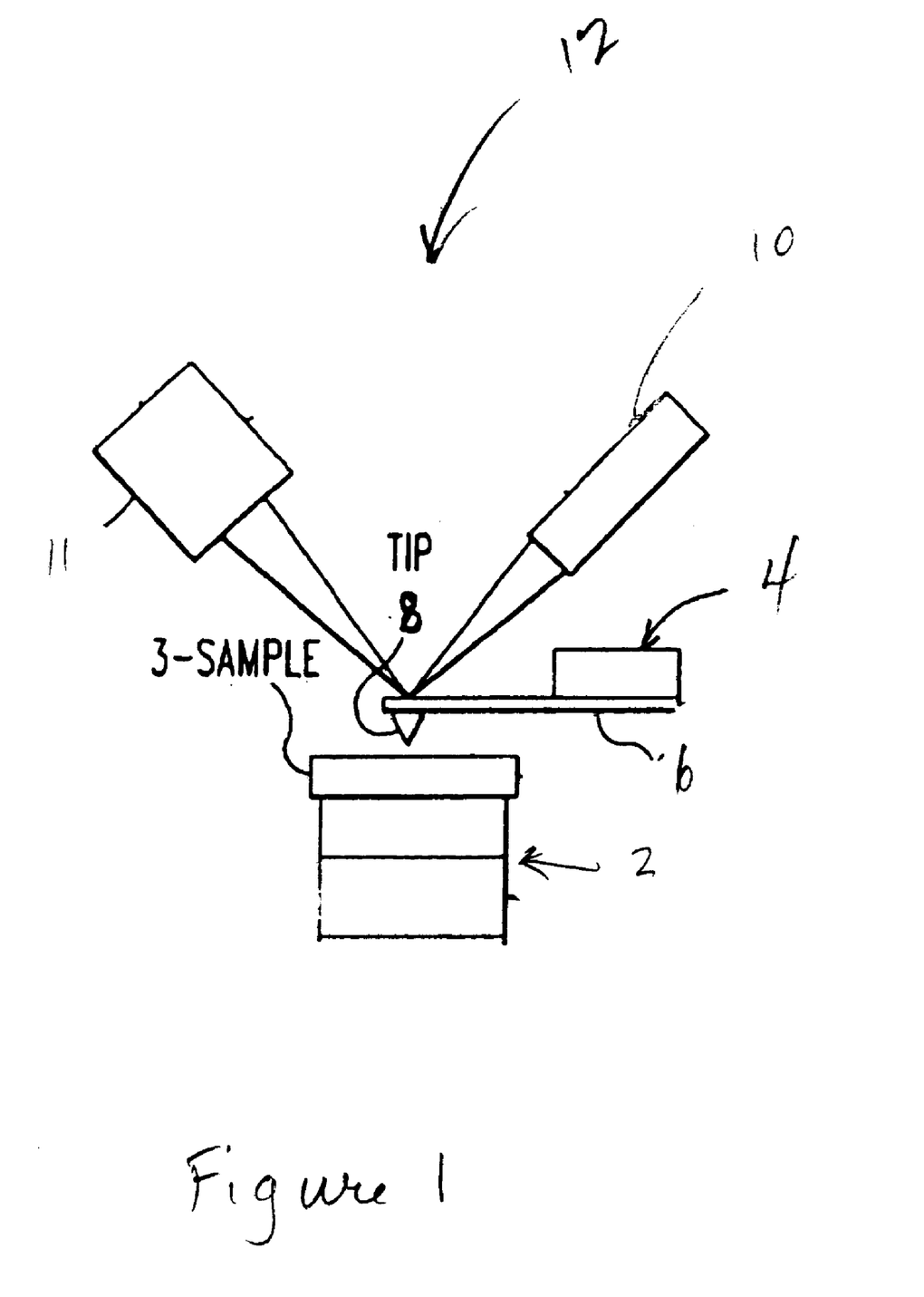

In another aspect, the present invention is a system (or "STCTM system") containing a Scanning Tunneling Charge Transfer Microscope (STCTM) probe. Like other SPM devices, and as illustrated in FIG. 1, the STCTM system 12 of the present invention contains a scanning system 2, a sample 3 to be analyzed, a probe comprising probe base 4 and cantilever 6 ending in a tip 8, a probe motion sensor comprising light source 10 and detector 11, as well as other traditional components of a SPM device such as data acquisition and control (not shown). Unless specifically mentioned otherwise, the conventional components/elements used in other known SPM systems can be employed in the present invention.

Suitable electronics used in conventional SPM systems can be used for data acquisition and control of the system of the present invention. Additionally, conventional SPM control and data acquisition mechanisms, including software, can be modified to create new mechanisms or algorithms necessary to control tip movement or optimize the performance of the STCTM probe in the system of the present invention.

As well, the other components/elements of conventional SPM systems can be used—or modified—for the present invention. For example, commercial non-contacting AFM systems can be used in the present invention, provided they are modified so that EFM measurements can be employed. This can be accomplished, for example, by adding a signal generator and lock-in amplifier to the AFM electronics and by creating a means for applying an electrical signal to the tip and/or sample.

The STCTM system of the present invention is modification of known Electrostatic Force Microscope devices. See, for example, Domansky et al. *Appl. Phys. Lett.,* 63, 1513 (1993) and Leng et al. *Colloids and Surfaces A: Physicochemical and Engineering Aspects* 93, 335 (1994), the disclosures of which are incorporated herein by reference. The modified probe (with a metal dot on end of insulated conducting tip as described below) is an example of one of these differences. Another modification is that in most EFM measurements, the electrical force measurements are performed at the resonance frequency of the cantilever. In STCTM measurements, however, the tip has to come very close (within 2 nm) to the surface to transfer charge by tunneling. The force gradients cause the resonance frequency to shift, moving the measurement frequency below the cantilever resonance. To avoid this, the frequency of the applied voltage used to drive the cantilever (force) is often chosen to be several hundred or even thousand Hz below the cantilever resonance frequency when the EFM probe is far from the surface. Thus, when the tip comes close to the surface, the shifted resonance frequency (due to force gradient at the surface) will match or be close to the actual drive frequency. Another example of how an EFM system can be modified is described in Klein et al. *Appl. Phys. Lett.,* 77, 3615 (2000), the disclosure of which is incorporated herein by reference.

In one aspect of the present invention, the STCTM system is built in and operates under an ultrahigh vacuum (UHV) environment. The system is required to perform systematic charge measurements on surfaces of the samples under analysis. This requires eliminating charge/current leakage paths created by ultrathin water layers or other contamination that exists on many surfaces, including the tip as well as the sample, under ambient conditions. The UHV environment is better able to eliminate such charge/current leakage paths than ambient conditions. Any suitable UHV system known in the art can be employed in the present invention, including those commercially-available from UHV STM or AFM vendors.

The system of the present invention, however, is not limited to UHV environments and can be modified for other operating environments. Any modification that eliminates such leakage current in the desired operating environment can be employed in the present invention. For example, an operating environment such as air can be employed. Special probes may be used which are hydrophobic on their surface to minimize the effects of water. As well, some sample surfaces may not require a UHV environment.

The tip of the STCTM probe is an important component in the system of the present invention. First, the tip should be configured so that tunneling to or from a conducting surface should be easily achieved. This can be achieved by assuring that the end of the probe is sharp and contains little to no oxide (or other insulating material) on its outermost surface. Second, as described below, the tip of the probe should also be small since the charge transfer measurement capability depends upon the capacitance of the metal dot, which is a part the tip of the probe, Any suitable tip known in the art serving the above functions can be employed in the STCTM probe of the present invention. When desired, the tips of the STCTM probe can be modified for different operating conditions. As described above, the system may need to operate under non-UVH conditions. In such an instance, it may be necessary to modify the probes by making them as known in the art with a hydrophobic surface, thus reducing the effect of water in non-UHV environments.

Figure 2:
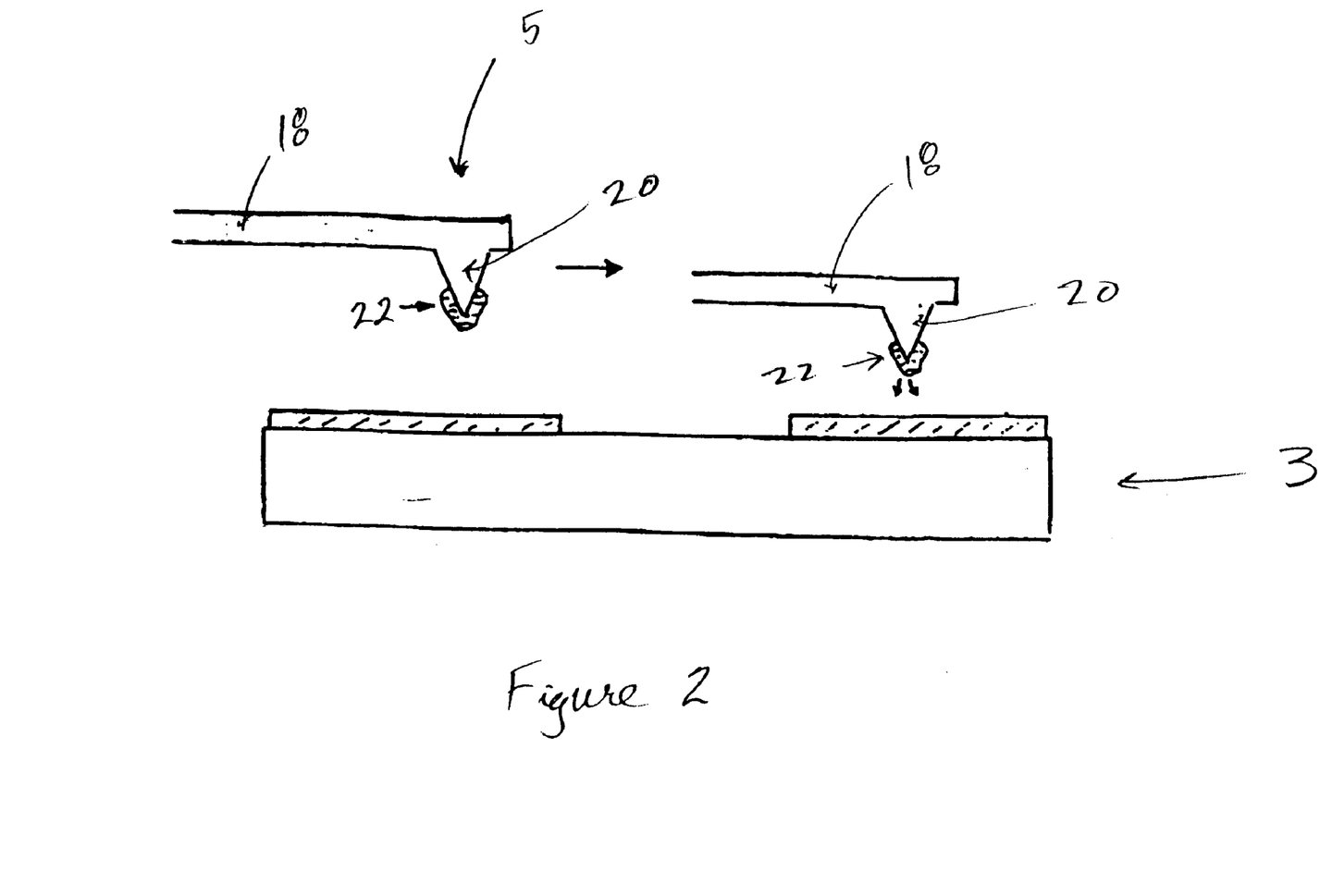
FIG. 2 illustrates an exemplary tip of the STCTM probe of the present invention.

The probe requirements for the charge transfer measurement are different than for ultralow current measurement, but the probe can be configured to measure both. FIG. 2 represents an example of the type of a tip needed for the measuring single charge transfer events. In this aspect of the invention, the probe 5 comprises a small metallic dot 22 located on the apex of an insulated tip 20 at the end of insulated cantilever 18. The insulated cantilever 18 and insulated tip 20 should electrically insulate the metallic dot 22. Thus, any type of insulating material known in the art can be employed, including oxides, nitrides, and oxynitrides. Preferably, the insulated cantilever 18 and insulated tip 20 is made of silicon oxide.

Any suitable metallic dot 22 can be used in the present invention. The small metallic dot can have any shape, provided the portion of the metallic dot 22 closest the sample to be measured is very small. Thus, a preferable shape for the metallic dot 22 is a triangular tip (referred to herein as the metal or metallic tip). The metallic dot should be metallic with little or no insulating material such as an oxide, thereby allowing tunneling to or from a conducting surface to be easily achieved. Thus, metals or metal alloys such as platinum, palladium, and gold can be employed as metallic dot 22. Preferably, platinum is employed as the material for the metallic dot 22.

In this aspect of the invention, the probe 5 therefore comprises an insulated tip 20 with a metallic dot at its apex. The metallic dot should also be small since the charge transfer measurement capability depends upon the capacitance of the tip. The size of the metallic dot, therefore, depends the desired capacitance. In one aspect of the invention, the size of the metallic dot ranges from about 1 nm to about 200 nm, and is preferably about 30 nm. A 30 nm size can produce a self capacitance on the order of $3 \times 10^{-18}$ farads, which is a good range for STCTM measurements according to the present invention.

Figure 3:
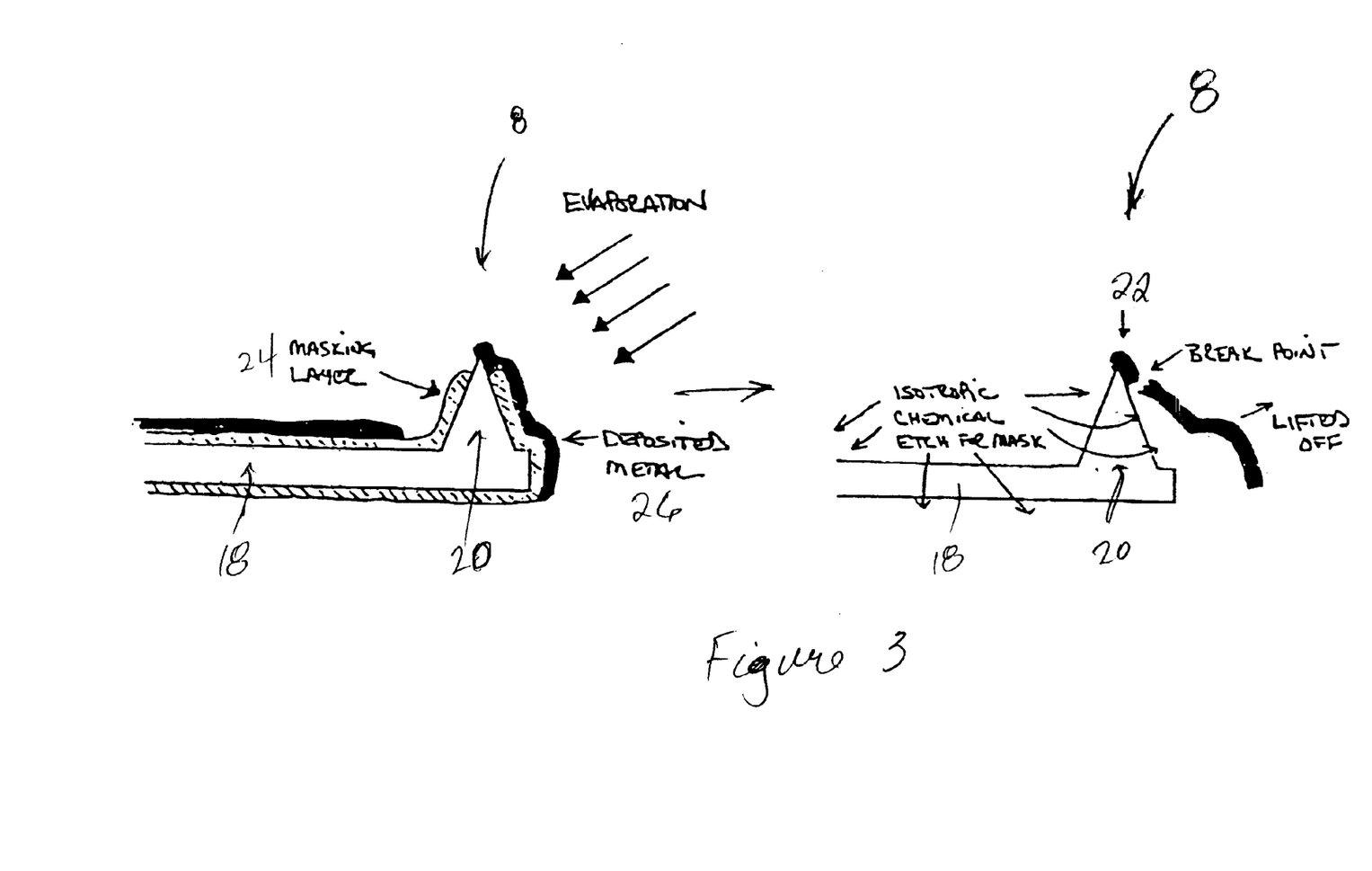
FIG. 3 illustrates one method for making a tip of the STCTM probe of the present invention.

There are several known fabrication methods for depositing a metallic dot on the end of an insulated tip, such as the insulating cantilever/tip illustrated in FIG. 2. Any of these known fabrication methods can be employed in the present invention. Preferably, the following method is employed to make these types of tips. First, as illustrated in FIG. 3, an insulated cantilever 18 with an insulated tip 20 is provided either by manufacture or purchase. Next, the insulated tip 20 is coated with any suitable masking material 24 by any known method in the art. Next, the apex of the masking material 24 is then removed using any suitable process, such as an etching process, thereby exposing the apex of the insulated tip 20.

Then, a metal layer 26 is deposited on the remaining masking material 24 and the exposed apex of insulated tip 20. The metal layer 26 should be deposited using any process that will not completely cover the masking material 24, yet will still cover the exposed apex of insulated tip 20. Preferably, the metal layer 26 is deposited at a 45° angle with respect to the tip axis to achieve this desired coverage. The masking material 26 can then be removed by any suitable process, such as a chemical etch followed by an ultrasonic lift off. In removing the remaining masking material, most of the metal layer 26 (except for the metal on the exposed apex of insulated tip 20) is consequently removed.

The structure resulting from this process has only the metal deposited on the apex of the insulated tip 20, as depicted in FIG. 3. Other processes achieving this same structure can also be employed in the present invention. Indeed, modifications can be made to the above process, for example, by using chemical etching to reduce the size of the deposited tip or using ion beam milling for constructing the isolated tips. As well, field evaporation—as described in Klein et al. *Appl. Phys. Lett.*, 77, 3615 (2000)—and electrochemical plating techniques could be employed in the fabrication process.

Figure 4:
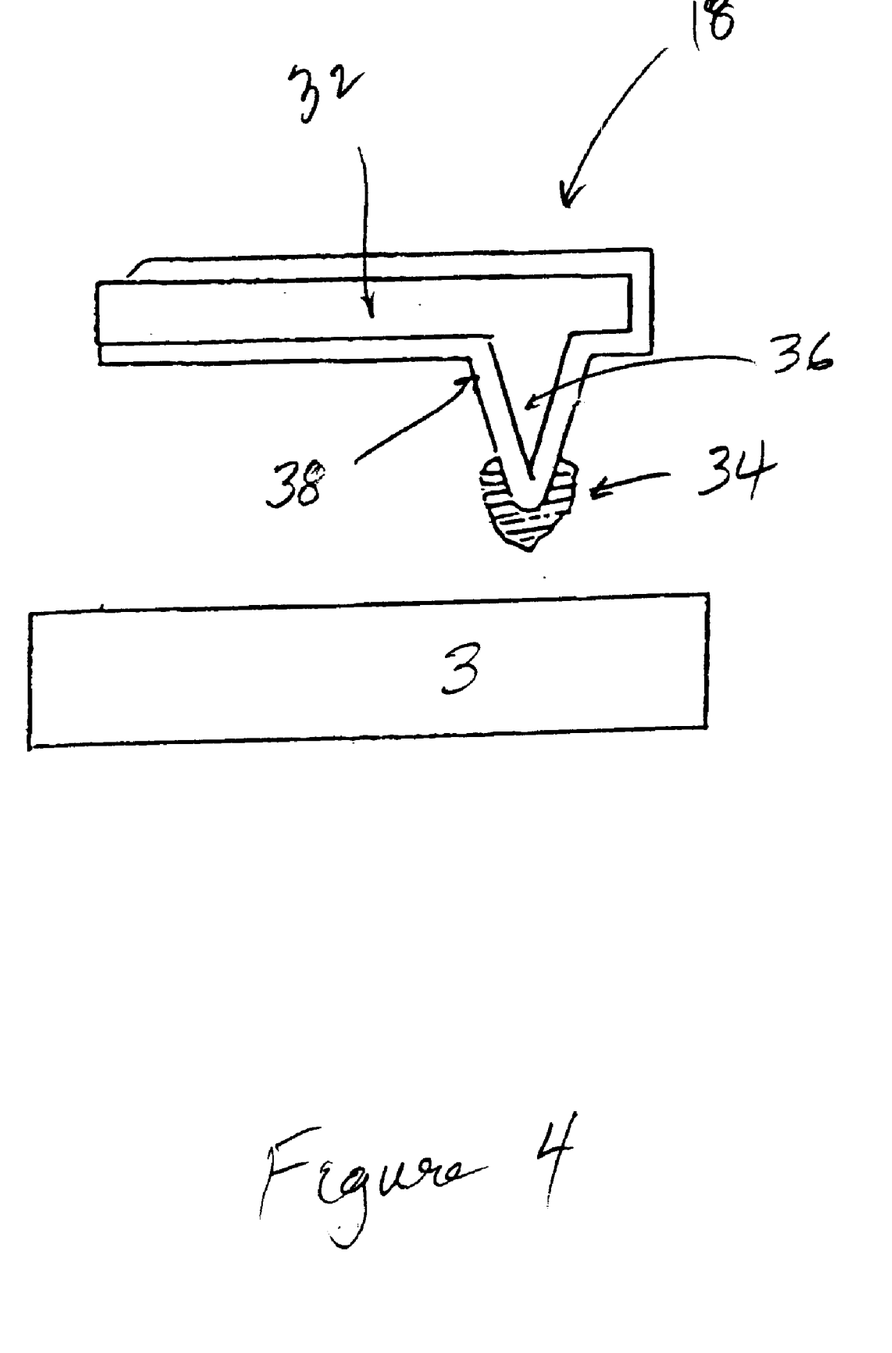
FIG. 4 illustrates another exemplary tip of the STCTM probe of the present invention.

As mentioned above, the probes need not only measure the charge transfer, but also must detect extremely small steady state currents. In this aspect of the present invention, the tips comprise a metallic dot 34 at the apex of a conductive tip 36 of a conductive cantilever 32. The metallic dot 34 should not be electrically isolated from the conductive tip/cantilever, but rather should be connected to it via a large series resistance using a partially insulating layer 38.

The conductive cantilever/tip structure can be made of any conducting, or semiconducting, material. Preferably, doped silicon is employed as material for the conductive cantilever/tip structure. The materials used for the metallic dot 34 and insulating layer 38 include those materials mentioned immediately above.

Figure 5:
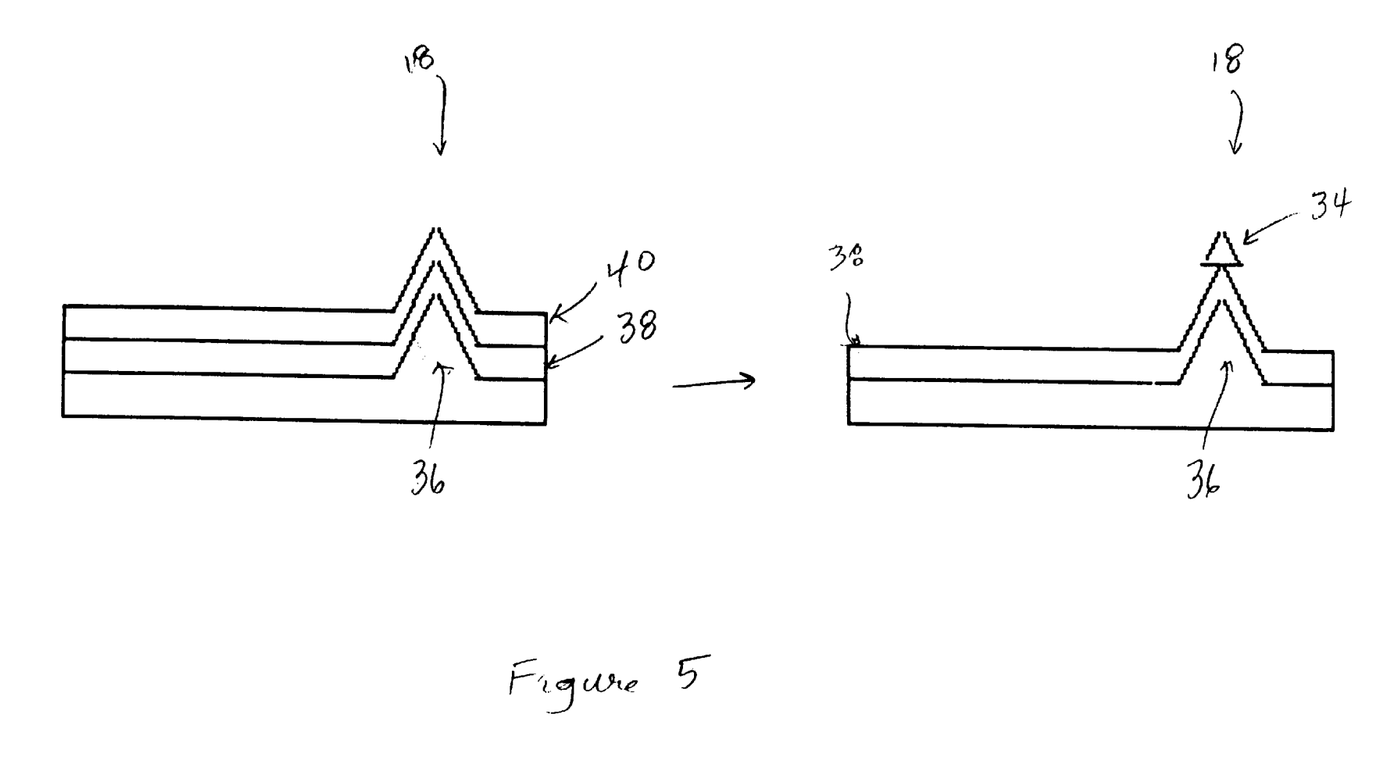
FIG. 5 illustrates another method for making a tip of the STCTM probe of the present invention.

In this aspect of the invention, the probe 18 can be formed by any suitable method known in the art. Preferably, the following method is used to form such probes and is depicted in FIG. 5. First, a silicon cantilever/tip structure is provided either through manufacture or purchase. The silicon tip is then covered by a 100 nm insulating layer 38, such as a silicon oxide layer by thermal oxidation, up to the first step. The resulting structure is overcoated with the desired metal or metal alloy 40, such as platinum, by any suitable deposition method. The desired amount of metal is then removed from the desired length of the silicon tip by any known process, such as etching, to leave a metallic dot 34 at the apex of probe 18. In one aspect of the invention, the tip can be exposed over a length of approximately 500 nanometers and the platinum is then removed up to within 100 nanometers of the apex.

In an alternate—but similar—method, a monolithic silicon cantilever 32 and tip 36 are provided either by manufacturing as known in the art or by purchasing any of those commercially available. Next, an insulating layer 38 like an oxide is provided on the silicon tip by any known method, such as oxide deposition or by thermal oxidation. This insulating layer is used to provide the necessary series resistance, as well as for the purposes of tip sharpening. The insulating layer is then coated with a metal or metal alloy layer 40, such as platinum, by any suitable deposition method. The desired amount of metal is then removed from the desired length of the silicon tip by any known process, such as etching, to leave a metallic tip at the apex of the insulated silicon tip.

Optionally, the insulating layer can be doped with a suitable dopant by any suitable known method to make it more conductive. The resistivity to be provided by the insulating layer can range from about $10^9$ to about $10^{18}$ ohm-cm, and preferably ranges from about $10^{14}$ to about $10^{16}$ ohm-cm. As an example of the operating characteristics, the resistance between a deposited metal tip with a square size of 100 nm and a silicon tip with a 10 nm thermal oxide is about $10^{18}$ to about $10^{20}$ ohms. For this resistance range and a 10 volt bias, the current flow ranges from about 100 to 1 electron/second. Resistivity values smaller (and larger) than the above noted range can also be produced to measure larger (and smaller) currents by reducing (or increasing) the quality of the oxide layer.

To help develop and analyze these tip structures of the present invention, diagnostic tools can be employed to understand the physical and electrical characteristics of the tips as they come out of the fabrication process. Any diagnostic tools known in the art can be employed. For example, Scanning Electron Microscopy (SEM) can be used in the analysis of the nanometer sized metal dots discussed above.

The diagnostic tools can be employed, for example, in the following manner. Using such tools like SEM, an estimate of the metallic tip size can be obtained. Based on the metallic tip size, the metallic tip/silicon tip capacitance can be estimated. Using the value of this capacitance, the resistance between the silicon tip and the metallic dot is determined by measuring the RC time constant for charging/discharging the tip when applying a known DC bias voltage. The electrostatic force between the tip and the sample will change in direct proportion to the charge on the tip. Thus, the charging time constant will be directly observable through the electrostatic force measurement and a rapid determination of the oxide resistance can be obtained. The diagnostic tools can likewise be employed to test other quality and operating characteristics of the tips.

The probes are employed in the following manner. The STCTM probe containing the tips depicted in both FIGS. 2 and 4 can be employed for detecting charge transfer. The tip is first charged, the voltage of the sample to be analyzed is reduced to zero, and the electrostatic force is monitored as the tip is brought into charge transfer range with the sample. Single discrete changes in the force signal—due to the charge transfer (via tunneling of charge to the sample)—result when bringing the tip in proximity with the sample. The measured force changes depending on the metallic tip size, charging voltage, and the applied electrostatic fields, as well as other controllable parameters in the STCTM system.

The STCTM probes depicted in FIG. 4 can also used to measure ultrasmall currents. This measurement can be achieved by applying a bias voltage to the tip, and measuring the tip potential as a function of height. If the probe is performing properly, the tip potential should not change until the tip/sample gap tunneling resistance becomes comparable to the resistance due to the insulating layer. At this point, the electrostatic force depends exponentially on the gap distance. This exponential dependence upon gap distance can be used to control the height of the tip with extremely high resolution by feedback for imaging, similar to that done in a conventional STM. The gap dependence signature can also verify the capabilities of the STCTM for the current measurement.

The system of the present invention containing the STCTM probe operates to accomplish several functions. The EFM portion of STCTM probe is a non-contacting AFM apparatus in which the electrical forces can be directly measured. Any similar SPM device, such as Kelvin Force Probe Microscope (KFPM), may be substituted for the EFM by appropriate modifications which allow such a device to operate to achieve the desired function.

A tip on a vibrating cantilever is brought near a sample surface to be measured. The amplitude of the vibration of the tip is modified as the tip approaches the surface due to surface force gradients and/or mechanical damping. A feedback loop provides a method for maintaining the tip at a fixed height above the surface. The gap distance can be controlled, depending upon the cantilever stiffness and vibration amplitude, at a distance ranging from zero up to about 10 nm. Unlike most AFM systems, the tip should not be in contact with the surface to allow the measurement of long range electrostatic forces. By applying an AC and/or DC electrical bias voltage to the tip with respect to a reference electrode on the sample, nanometer scale electrical measurements can be performed.

The EFM can measure (and image) surface charge, surface potential, and tip/sample capacitance (dielectric mapping) on a nanometer scale. For example, the charge distribution on the surface of chemically modified teflon-FEP can be imaged and quantitatively measured with 30 nm spatial resolution. In another example, charge mapping can be performed on red blood cells in air. In yet another example, dielectric mapping can be performed on HEMA contact lens surfaces using the EFM portion. Finally, the movement of mobile charges on insulator surfaces can performed with the EFM portion.

The charge sensitivity of the STCTM probe must be enough to detect a single elementary charge. If desired, however, the sensitivity can exceed that minimum sensitivity. For example, the decay of charged particles on an insulating surface can be measured by single charge carrier recombination in air with a reasonable detection bandwidth (30 millisecond time constant). If such measurements are performed in vacuum, the charge sensitivity can be increased by more than an order of magnitude.

To obtain high quality surface charge measurements, the surface of the tip and the sample must be appropriately prepared for measurement. The existence of unknown surface layers may provide a path for charge movement, making the measurement questionable. Thus, any unknown surface layers should be removed before measurement. For example, the existence of ultrathin water layers on silicon surfaces (which are created when the tip or sample is exposed to air) can decrease the accuracy and effectiveness of the measurement. Thus, surfaces should be clean and dry. To prevent the presence of such unknown layers (like water layers) and to perform the charge and current measurements most effectively, a UHV environment is preferably employed.

The system of the present invention containing the STCTM probe can also measure the transfer of single electrons between a tip and a sample. As illustrated in FIG. 2, a small conducting tip is fabricated on the end of an insulating tip/cantilever. Then, a controllable amount of charge is placed on the tip by any method known in the art. In one such method, the tip is brought near a metallic surface held at a potential V (by a voltage source). The tip is allowed to electrically contact the sample. A potential V on the metallic dot results from this contact, which involves the transfer of a charge between the tip and sample. The amount of charge depends upon the size and geometry of the tip and the magnitude of the potential V.

The tip is then retracted from the surface while the charge on the tip is maintained. During this retraction, the tip does not discharge, back to the surface, since its potential is the same as that of the surface. The metallic surface is then grounded. The electrical potential of the tip and sample are now different due to the change in the sample potential. The potential difference is due to the excess charge on the tip (i.e., the tip has been charged).

The amount of electron charge that can be deposited on the tip depends on the voltage used and the tip size. Any combination of voltage and tip size can be employed in the present invention, provided the electron charge (positive or negative) is deposited. For example, with a 100 nanometer metallic tip size, the tip capacitance is about 10–17 farads and a tip potential of 10 millivolts would correspond to an approximate excess charge of one electron.

The tips of the STCTM probes depicted in FIG. 4 are charged differently than the tips illustrated in FIG. 2. When the metallic dot is formed on the tip in FIG. 4, it is not completed insulated as the metallic dot in FIG. 2. Thus, the metallic dot 34 of probes 18 are charged by applying a voltage to the conducting cantilever/tip structure. The voltage causes electrons move from the conducting tip through the insulating layer to the metallic dot. The metallic dot 34 is charged depending RC time constant of the oxide layer and the metallic dot.

Once the tip of the STCTM probe is charged, it is positioned at any desired location on the sample, such as a molecule, quantum dot, or cluster. The gap is then reduced until the tunneling probability becomes large enough to allow a single electron to tunnel from the tip to the sample within a desired measurement time. The charge transfer may occur at a conducting or insulating region on the sample since continuous current is not required. As the charge transfer event takes place, the electrostatic potential of the tip with respect to the surface will change, modifying the electrostatic force between the tip and sample and allowing the charge transfer event to be directly monitored by the STCTM system.

The gap between the tip and the sample will determine the average rate of charge transfer. For charge transfer at atomic resolution, the tip can be brought within tunneling range, e.g., about 0.5 to about 3 nm. As the charge transfers between the tip and sample, the potential difference will decrease until the desired charge has been transferred. If desired, the tip can be then charged again and the process described above repeated.

The charge is not limited to being transferred from the tip to the sample. By choosing the appropriate polarity of the charging voltage V, electrons can be transferred to or from the tip or sample.

The charge can be transferred between the tip and the sample via any suitable mechanism depending on the voltage, gap distance, and work function. Such mechanisms include tunneling, field emission, or thermionic emission, as well as others known in the art. For example, at gap distances of 50 nanometers, the dominant mechanism for transfer is thermionic emission.

Preferably, a tunnel-dominated charge transfer with atomic spatial resolution is employed as the transfer mechanism. To achieve a tunneling-dominated charge transfer, the charged tip can be rapidly moved from a position far from the sample (100 nm) to the tunneling range (about 1.5 nm). If this height change is performed rapidly (e.g., in a period that is short compared to the average thermionic emission time on the order of seconds), the charge transfer will be dominated by tunneling and atomic scale resolution can be achieved. For example, if the tip is moved on a millisecond time scale, atomic resolution should be obtainable.

The system of the present invention containing the STCTM probe is also able to detect ultrasmall currents. The ability for ultrasmall current detection is based the ability to detect the electrostatic potential difference between a tip and sample. In this aspect of the invention, the metallic dot is continuously supplied with charge through the very large series resistance provided by the insulator. This large series resistance causes a voltage difference between the metallic and the conducting tip when current flows. This voltage drop depends on the tip/sample (gap) resistance, which in turn depends upon the gap distance and tunneling probability. The large series resistance provides a way to convert the current flowing between the tip, dot, and the sample into a voltage difference measurable by the STCTM.

In a conventional EFM, the series resistance is typically negligible and the voltage drop between the tip and sample is essentially independent of the current flowing between the tip and sample. Thus, a conventional EFM is incapable of measuring the tunneling current between a metallic dot and a conducting surface.

The system of the present invention containing the STCTM probe can be used to measure any desired nanometer scale systems. For example, the present invention can be used to characterize biomolecules, including DNA, at very low currents. Such molecules may be imaged with the STCTM at currents ranging from about $10^{-15}$ to about $10^{-18}$ ampere, currents which are orders of magnitude smaller than those previously used, e.g., about $10^{-12}$.

Operating at lower currents can provide distinctive advantages. It is believed that imaging at such low currents will reduce the interaction forces that make it difficult to image weakly adsorbed molecules at surfaces. It is also believed that the structure or spatial resolution seen by the STCTM under ultralow current bias conditions may be different (i.e., new contrast mechanisms, higher spatial resolution) than those available to conventional STM.

The present invention can also be used to characterize many properties of ultrathin insulating films. Ultrathin insulating films, such as oxide and nitride layers, are of great technological importance today as they represent fundamental building blocks for constructing increasingly smaller scale electron devices. The present invention can be used to measure many characteristics of silicon surfaces covered with insulating layers, especially ultrathin insulating films with a thickness ranging from about 1 to about 20 nm. First, the STCTM probe can measure single charged traps in the insulating films. Second, the present invention could be also used to determine charge defect densities. Third, current leakage through ultrathin insulating films on an atomic scale can be measured. Fourth, characterization of metallic nanoclusters on insulators is possible.

The present invention can also be used for other purposes. For example, the STCTM probes can be used to measure the spatial and energy distributions of trapped states in thin insulating films. In that vein, electronic spectroscopy of filled or unfilled surface states in insulating materials by a single electron transfer is possible using the present invention. By ramping the voltage on the STCTM probe and then measuring the voltage at which an electron tunnels from the probe to the surface, one can explore and measure the energy of the location of the sample above which the probe is placed. The STCTM of the present invention can accomplish what is achieved by using scanning tunneling spectroscopy (STS). See, for example, the work of R. Feenstra.

Using the STCTM probe of the present invention, the various electronic measurements of the individual locations can be performed. Such measurements of each individual location are important for the reasons mentioned above. Even more important, however, is combining the individual measurements together for the entire region of the sample under consideration. This combination of individual measurements yields a "map" of the region of the sample being analyzed, allowing a greater understanding of the properties and characteristics of that region.

In another aspect of the invention, the measurements obtained above can obtained in a different manner. The STCTM probe described above is able to obtain the measurements by measuring the force exhibited when the cantilever moves in response to the electron charge transfer. However, the electron charge transfer can be measured in any suitable manner without using such a force measurement.

Figure 6:
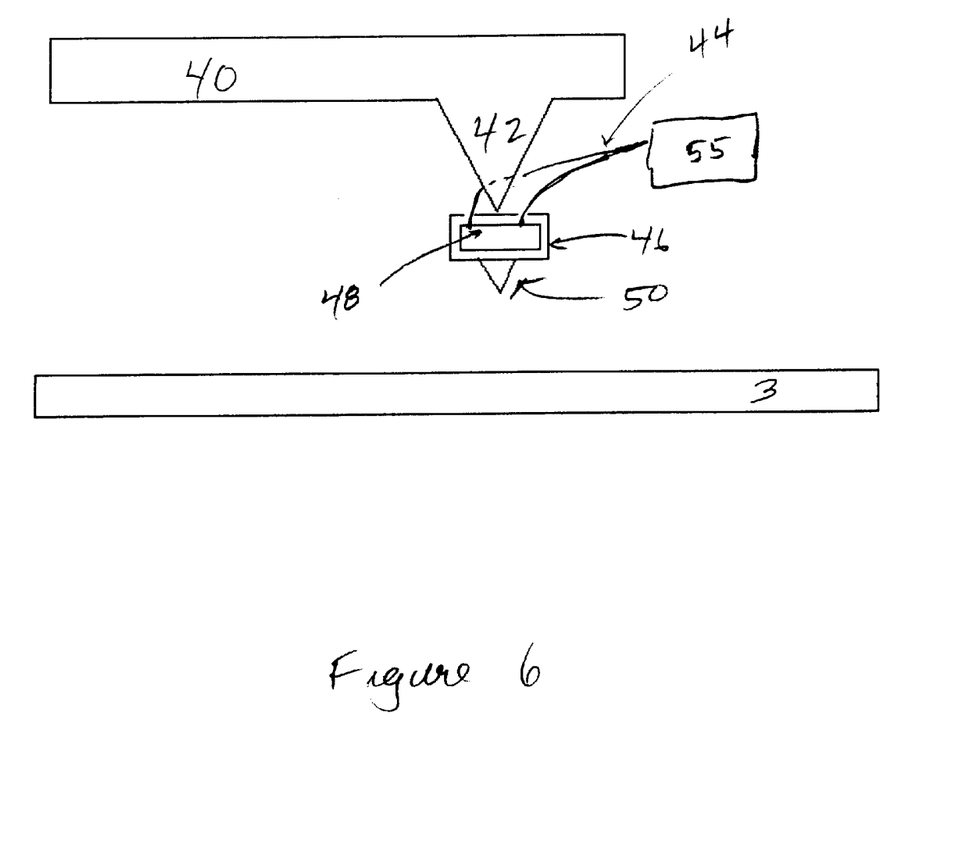
FIG. 6 depicts a modified probe of the STCTM system of the present invention.

An example of a non-force measurement is depicted in FIG. 6. A cantilever 40 contains a tip 42. Attached to the tip 42 is a single electron charge transistor 48. See, for example, M. S. You et al. *Science* Vol. 276 (1997) p. 579, the disclosure of which is incorporated herein by reference. The transistor 48 has been electrically insulated using insulating layer 46. The transistor 48 is connected to resistance meter 55 via leads 44. A small metallic dot 50 is placed on the surface of the insulating layer 46. The above structure can be prepared in manner similar to the manufacturing processes described above. When a single electron charge is transferred from the metallic dot to the surface of sample 3, the transistor is able sense the charge change by capacitive coupling to the metallic dot, thereby changing the resistance measured by the restistance meter 55 through the leads 44.

Thus, the present invention containing a STCTM probe significantly extends the capabilities of existing atomic scale characterization methods and devices. The combination of ultrasmall charge/current detection and atomic spatial resolution provides a powerful tool for examining nanostructures, including conducting and insulating surfaces. These measurement capabilities will have a profound impact on nano-science and engineering.

Having described the preferred embodiments of the present invention, it is understood that the invention defined by the appended claims is not to be limited by particular details set forth in the above description, as many apparent variations thereof are possible without departing from the spirit or scope thereof.

I claim:

1. A tip for a scanning probe microscope comprising:
    a conductive tip;
    an insulating layer over the conductive tip; and
    a metallic dot over the insulating layer.
2. The tip of claim 1, wherein the conductive tip comprises silicon.
3. The tip of claim 1, wherein the insulating layer comprises silicon oxide.
4. The tip of claim 1, wherein the metallic dot comprises platinum.
5. A tip for a scanning probe microscope comprising:
    an insulating tip; and
    a metallic dot over the insulating tip.
6. The tip of claim 5, wherein the insulating tip comprises silicon oxide.
7. The tip of claim 5, wherein the metallic dot comprises platinum.
8. A probe for a scanning probe microscope comprising:
    a conductive cantilever having a conductive tip;
    an insulating layer over the conductive tip; and
    a metallic dot over the insulating layer.
9. The probe of claim 8, wherein the conductive tip comprises silicon.
10. The probe of claim 9, wherein the insulating layer comprises silicon oxide.
11. The probe of claim 9, wherein the metallic dot comprises platinum.
12. A probe for a scanning probe microscope comprising:
    an insulating cantilever having an insulating tip; and
    a metallic dot over the insulating tip.
13. The probe of claim 12, wherein the insulating tip comprises silicon oxide.
14. The tip of claim 12, wherein the metallic dot comprises platinum.
15. A system for a scanning probe microscope containing a tip comprising:
    a conductive tip;
    an insulating layer over the conductive tip; and
    a metallic dot over the insulating layer.
16. A system for a scanning probe microscope containing a tip comprising:
    an insulating tip; and
    a metallic dot over the insulating tip.
17. A method for making a tip for a scanning probe microscope, comprising:
    providing a cantilever with a conductive tip thereon;
    providing an insulating layer on the conductive tip;
    providing a metal layer on the insulating layer; and
    removing a portion of the metal layer, leaving a metal tip on the apex of the insulated conductive tip.
18. The method of claim 17, including removing a portion of the metal layer by a selective etching process.
19. A method for making a tip for a scanning probe microscope, comprising:
    providing a cantilever with an insulated tip thereon;
    providing a masking layer on the insulated tip;
    removing a portion of the masking layer, thereby exposing the apex of the insulated tip,
    providing a metal layer on the apex of the insulated tip and the masking layer; and
    removing the remaining masking layer and the metal layer overlying the masking layer.
20. The method of claim 19, wherein removing the remaining masking layer leaves a metal dot on the apex of the insulated tip.
21. A method for using a scanning probe microscope, comprising:
    providing a scanning probe microscope containing a tip, the tip comprising a conductive tip, an insulating layer over the conductive tip, and a metallic dot over the insulating layer;
    providing a surface to be analyzed; and
    using the scanning probe microscope to measure the transfer of an amount of charge or current to or from the surface.
22. The method of claim 21, further including operating the scanning probe microscope under an ultrahigh vacuum.
23. A method for using a scanning probe microscope, comprising:
    providing a scanning probe microscope containing a tip, the tip comprising an insulated tip and a metallic dot over the insulated tip;
    providing a surface to be analyzed; and
    using the scanning probe microscope to measure the transfer of an electronic charge to or from the surface.
24. The method of claim 23, further including operating the scanning probe microscope under an ultrahigh vacuum.
25. A method for using a scanning probe microscope, comprising:
    providing a scanning probe microscope containing a tip, the tip comprising a conductive tip, an insulating layer over the conductive tip, and a metallic dot over the insulating layer;

providing a surface to be analyzed; and using the scanning probe microscope for spectroscopic measurements.

26. The method of claim 25, wherein the spectroscopic measurements determine the charge transfer as a function of the voltage applied to the metallic dot.

27. A scanning probe microscope, comprising:

a cantilever containing a tip;

an insulated transistor electrically connected to means for measuring resistance; and a metallic dot over the insulated transistor.

* * * * *